(12) United States Patent
Thomson et al.

(10) Patent No.: US 6,640,312 B1
(45) Date of Patent: Oct. 28, 2003

(54) SYSTEM AND METHOD FOR HANDLING DEVICE RETRY REQUESTS ON A COMMUNICATION MEDIUM

(75) Inventors: Andrew Thomson, Austin, TX (US); David W. Madden, Austin, TX (US); Glen Sescila, Pflugerville, TX (US); Aljosa Vrancic, Austin, TX (US)

(73) Assignee: National Instruments Corporation, Austin, TX (US)

( * ) Notice: Subject to any disclaimer, the term of this patent is extended or adjusted under 35 U.S.C. 154(b) by 660 days.

(21) Appl. No.: 09/629,349

(22) Filed: Aug. 1, 2000

(51) Int. Cl.[7] .................................. G06F 11/00
(52) U.S. Cl. ........................ 714/5; 714/9; 714/43
(58) Field of Search ........................ 714/4, 5, 9, 43, 714/44

(56) References Cited

U.S. PATENT DOCUMENTS

| | | | |
|---|---|---|---|
| 5,875,313 A | | 2/1999 | Sescila, III et al. |
| 5,923,673 A | * | 7/1999 | Henrikson ............... 371/20.1 |
| 5,937,175 A | | 8/1999 | Sescila, III et al. |
| 5,953,511 A | | 9/1999 | Sescila, III et al. |
| 6,389,560 B1 | * | 5/2002 | Chew ....................... 714/43 |
| 2001/0044914 A1 | * | 11/2001 | Nakano et al. ............ 714/43 |
| 2002/0049933 A1 | * | 4/2002 | Nyu .......................... 714/43 |

* cited by examiner

Primary Examiner—Scott Baderman
Assistant Examiner—Timothy M Bonura
(74) Attorney, Agent, or Firm—Meyertons Hood Kivlin Kowert & Goetzel, P.C.; Jeffrey C. Hood (57) ABSTRACT

A system and method for transferring data over a communications medium. A host is coupled to a device through a serial bus lacking error handling capabilities, such as an IEEE 1394 bus. The host may control the device by sending requests accessing its memory registers. The host generates a first request to the device to access a memory address location of the device, and which includes an address and status information indicating whether a prior request to the memory address location returned successfully. The device examines the status information to determine if it is a retry of a prior request, and if so, determines if the prior request completed successfully to the memory address location by comparing the address and data transfer size of the first request to those of the prior request. If identical, then the prior request completed successfully to the memory address location, and the request is ignored. Otherwise, the device retries the prior request. If the first request is not a retry the device performs it and returns an acknowledgement to the host indicating successful completion. If the host does not receive valid acknowledgement, it retries the first request, otherwise, it completes a transaction associated with the first request. Then, a new transaction request may be received which results in a new request being generated by the host to access the memory address location. The host may manipulate the status information in the new request to indicate that the first request to the memory address location returned successfully.

24 Claims, 8 Drawing Sheets

SYSTEM AND METHOD FOR HANDLING DEVICE RETRY REQUESTS ON A COMMUNICATION MEDIUM

BACKGROUND OF THE INVENTION

1. Field of the Invention

This invention relates to data communications and data delivery over communication media, and, more particularly, to host computer-based data acquisition systems.

2. Description of the Relevant Art

Various types of communication mediums have been proposed for connecting external devices to computer systems. For example, two serial bus standards that have been proposed are USB (Universal Serial Bus) and IEEE 1394 (Firewire).

IEEE 1394 is an international standard, low-cost digital interface that integrates entertainment, communication, and computing electronics into consumer multimedia. Originated by Apple Computer as a desktop LAN and developed by the IEEE 1394 working group, IEEE 1394 is a hardware and software standard for transporting data at 100, 200 or 400 megabits per second (Mbps). Maximum packet sizes are 512, 1024, and 2048 bytes depending on the transfer speed. 1394 provides 64-bit addressing—The 16 MSb's (most significant bits) are used for determining source/destination bus/node. As used herein, the terms "node" and "device" may be used interchangeably to denote a node on the 1394 bus.

According to the IEEE 1394 standard, there can be up to 1023 buses each with up to 63 nodes. The 48 LSb's (least significant bits) are used to access locations within a device's addressing space. 1394 provides for Direct Memory Access (DMA). DMA is the most powerful feature of the bus for the data acquisition purposes since it allows a device to transfer data from/into computer memory without microprocessor intervention.

IEEE 1394 also defines a digital interface—there is no need to convert digital data into analog and tolerate a loss of data integrity. 1394 is easy to use in that there is no need for terminators, explicit device IDs, or elaborate setup. Another benefit of 1394 is that it is "hot pluggable", meaning users can add or remove 1394 devices with the bus active. 1394 has a scaleable architecture, allowing users to mix 100, 200, and 400 Mbps devices on a bus. 1394 also provides a flexible topology in that it supports daisy chaining and branching for true peer-to-peer communication between 1394 devices. In addition to asynchronous data transfer, 1394 provides isochronous data transfer, which guarantees bus bandwidth and may reduce costly buffer requirements.

Serial Bus Management provides overall configuration control of the serial bus in the form of optimizing arbitration timing, guarantee of adequate electrical power for all devices on the bus, assignment of which IEEE 1394 device is the cycle master, assignment of isochronous channel ID, and notification of errors. Bus management is built upon IEEE 1212 standard register architecture. It should be noted that 1394 error notification is limited to general error detection. When an error has occurred, it may not be known when or where the error occurred, and so the delivery status of transmitted data may also be unknown.

There are two types of IEEE 1394 data transfer: asynchronous and isochronous. Asynchronous transport is the traditional computer memory-mapped, load and store interface. Data requests are sent to a specific address and an acknowledgment is returned. In addition to an architecture that scales with silicon technology, IEEE 1394 features a unique isochronous data channel interface. Isochronous data channels provide guaranteed bus bandwidth for data transport at a pre-determined rate. This is especially important for time-critical multimedia data where just-in-time delivery eliminates the need for costly buffering.

Much like LANs and WANs, IEEE 1394 is defined by the high level application interfaces that use it, not by a single physical implementation. Therefore as new silicon technologies allow high higher speeds, longer distances, and alternate media, IEEE 1394 will scale to enable new applications.

The IEEE 1394 bus was primarily intended for computer multimedia peripherals such as audio and video devices. In general, error detection and correction is not necessary for multimedia data streams, and thus error correction is not included in the IEEE 1394 standard. However, the IEEE 1394 bus has other potential applications, such as communication and control with other types of devices. One potential application for the IEEE 1394 bus is remote data acquisition, test and measurement, and industrial automation. For example, the IEEE 1394 bus could be used to connect a remote data acquisition device, measurement device, or industrial automation device to a host computer.

Certain external buses, such as Universal Serial Bus (USB), provide error detection and correction protocols within their specifications and thus are suitable for various types of devices, including devices which receive control data. However, the use of protocols such as 1394 for providing control data to a device may be problematic in that IEEE 1394 only provides an error detection protocol. This error detection protocol is insufficient for devices, such as data acquisition (DAQ) devices, since it does not determine where the error occurred and whether the requested data has been written to the device. In many processes, such as data acquisition processes, one cannot simply repeat a read or write transaction to the device because many registers are FIFOs (First In, First Out structures) or control registers, in which repeating the transaction will either cause a glitch or inaccurate data. Therefore improved systems and methods for enabling devices which receive control data to be used with communication mediums that do not support error correction. More particularly, improved systems and methods are desired for handling device retry requests on a communication medium that does not support error correction. Further, improved systems and methods are desired for enabling instruments, data acquisition devices, and industrial automation devices to be used with the IEEE 1394 bus.

SUMMARY OF THE INVENTION

The present invention comprises various embodiments of a system and method for transferring data over a communications medium. A host computer may be coupled to a device, such as an instrument, which may be further coupled to a sensor. The instrument may be a data acquisition (DAQ) device, which combined with the sensor, may be operable to collect data concerning pressure, temperature, chemical content, current, resistance, voltage, or any other detectable attribute. The host computer may be operable to control the instrument by sending requests to read from or write to the instrument's memory registers. The host computer may be further operable to obtain data from the instrument for storage and analysis on the host computer system. In one embodiment, the host computer may comprise a computer system, wherein the computer system is coupled to the instrument through a serial bus, such as an IEEE 1394 bus, as described in an IEEE 1394 protocol specification. In other embodiments the bus may implement other protocols such as, Ethernet, or any other serial communication protocol which does not inherently support error correction.

In one embodiment, the instrument may include a remote PCI instrument card which is coupled to a 1394/PCI bridge, such as a National Instruments FirePHLI™. The 1394/PCI bridge provides translation between the IEEE 1394 protocol and PCI, allowing the host system to send 1394 requests to and receive 1394 responses from the remote PCI device.

In yet another embodiment, two such instruments may be coupled together via the 1394 bus. One instrument may be configured as a host, or master unit, while the other instrument may be configured as a slave. Each instrument may be coupled to a sensor. In one embodiment, each instrument is configured with a processor card with memory on board to execute driver software.

According to one embodiment of the invention, the host computer system generates a request to the DAQ device. The request may include a first device request to read from or write to a memory address location of the device. The first device request may include status information which indicates whether a prior device request to the memory address location of the device returned successfully.

The device receives the first device request, then examines the status information to determine if the first device request is a retry of a prior device request to the memory address location of the device. In a preferred embodiment, the status information may comprise a toggle bit which is contained in the memory address of the first device request. If the toggle bit has not been toggled, then the first device request is a retry; if the toggle bit has been toggled, then the first device request is a new request.

If the status information indicates that the device request is a retry of a prior device request, then this indicates that the host computer did not receive a valid acknowledgement to the prior device request. In this case, the host computer does not know whether the error in the prior device request occurred before the device access or after the device access. In other words, for example, the host computer does not know if the error occurred prior to the write, in which case the write was not performed to the device, or the error occurred in the acknowledgement after the write, in which case the write did complete successfully. Thus, if the status information indicates a retry, the device may determine if the prior device request completed successfully to the memory address location of the device. This is done by comparing the address and data transfer size of the first device request to those of the prior device request. If they are identical, then the prior device request did complete successfully to the memory address location of the device, and the device may ignore the retry request. Otherwise, the prior device request did not complete successfully to the memory address location of the device, and so the device may perform the retry of the prior request.

If the first device request is not a retry of the prior device request to the memory address location of the device, then the device performs the first device request, and returns an acknowledgement to the host, indicating that the first device request was completed successfully. The host determines whether a valid acknowledgement was received indicating that the first device request was completed successfully.

If the host computer system does not receive valid acknowledgement from the device, the host computer system retries the first device request. When the host computer retries the first device request, the host computer does not manipulate the status information, e.g., does not toggle the address bit, and thus the status information indicates that the request is a retry.

The host computer system completes a transaction associated with the first device request in response to the host computer system receiving a valid acknowledgement from the device, i.e. the request returning successfully. Then, a new transaction request may be received which results in a new device request being generated by the host computer system. The new device request may comprise a request to read from or write to the memory address location of the device. The host computer system may manipulate the status information in the new device request, e.g., toggle the address bit, to indicate that the first device request to the memory address location of the device returned successfully. In general, for any new device request to a memory address location (i.e. not a retry) the host computer system may manipulate the status information for that memory address to indicate that a prior request to that address location completed successfully. In one embodiment, as mentioned above, the status information may be comprised in the address of the device request, and may comprise a status bit or toggle bit, which may be toggled by the host computer system to indicate that the prior device request to the memory address location of the device returned successfully.

BRIEF DESCRIPTION OF THE DRAWINGS

Other advantages and details of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

U.S. Pat. No. 5,875,313 titled "PCI Bus to IEEE 1394 Bus Translator Employing Write Pipe-Lining and Sequential Write Combining", whose inventors are Glen O. Sescila III, Brian K. Odom, and Kevin L. Schultz, and which issued on Feb. 23, 1999, is hereby incorporated by reference in its entirety as though fully and completely set forth herein.

Figure 1:
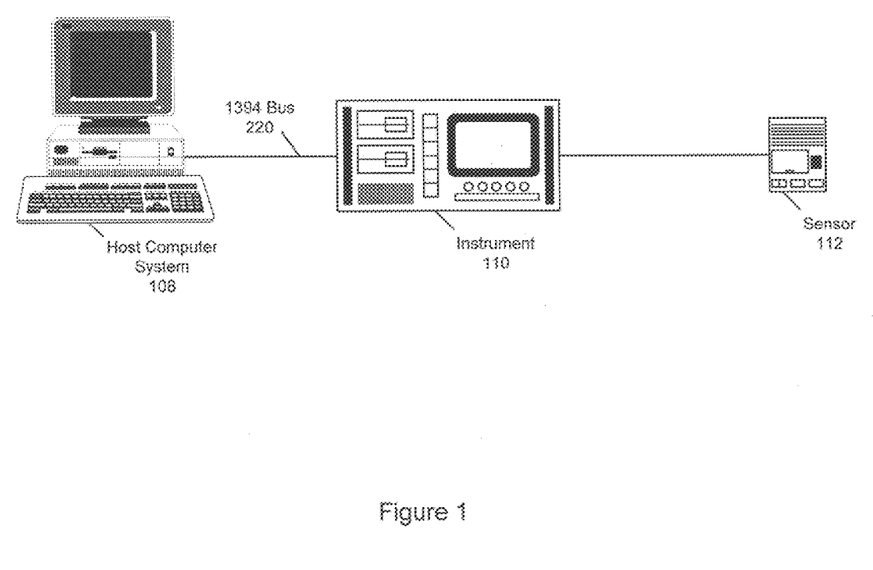
FIG. 1 is an illustration of a data acquisition system, according to one embodiment.

FIG. 1—A Data Acquisition System

FIG. 1 illustrates a system according to one embodiment. It is noted that the present invention may be used in various types of systems wherein a host computer communicates with an external device. Exemplary systems include test and measurement systems, industrial automation systems, process control systems, motion control systems and other types of systems. In the preferred embodiment described below, the device is a data acquisition (DAQ) device, and the system is a computer-based DAQ system.

As FIG. 1 shows, a host computer system 108 is coupled through a communication medium 220 to a data acquisition device or instrument 110, which is further coupled to a sensor 112. In a preferred embodiment, the bus 220 may be an IEEE 1394 bus, such as described in the current or future IEEE 1394 protocol specifications, although in other embodiments the bus may implement other protocols such as Ethernet, or any other serial communication protocol. It should be noted that the 1394 protocol does not provide error handling capabilities, and so is an exemplary system for implementing various embodiments of the invention.

The sensor 112 may be any type of transducer which is operable to detect environmental conditions and send sensor data to the instrument 110. The instrument 110 may be a data acquisition (DAQ) device, which combined with the sensor 112, may be operable to collect data concerning pressure, temperature, chemical content, current, resistance, voltage, or any other detectable attribute. The instrument or DAQ device 110 may also include data generation capabilities. The host computer system 108 may be operable to control the instrument 110 by sending requests to read from or write to the instrument's memory registers. The host computer system 108 may be further operable to obtain data from the instrument 110 for storage and analysis on the host computer system 108, either by issuing read requests or by programming the instrument 110 to send data to the memory of the host computer 108.

The host computer 108 preferably includes a memory medium on which computer programs of the present invention are stored. The host computer executes instructions from the memory medium to handle device retry requests on the communication medium 220. The memory medium may include a software architecture similar to that shown in FIG. 4.

Figure 2A:
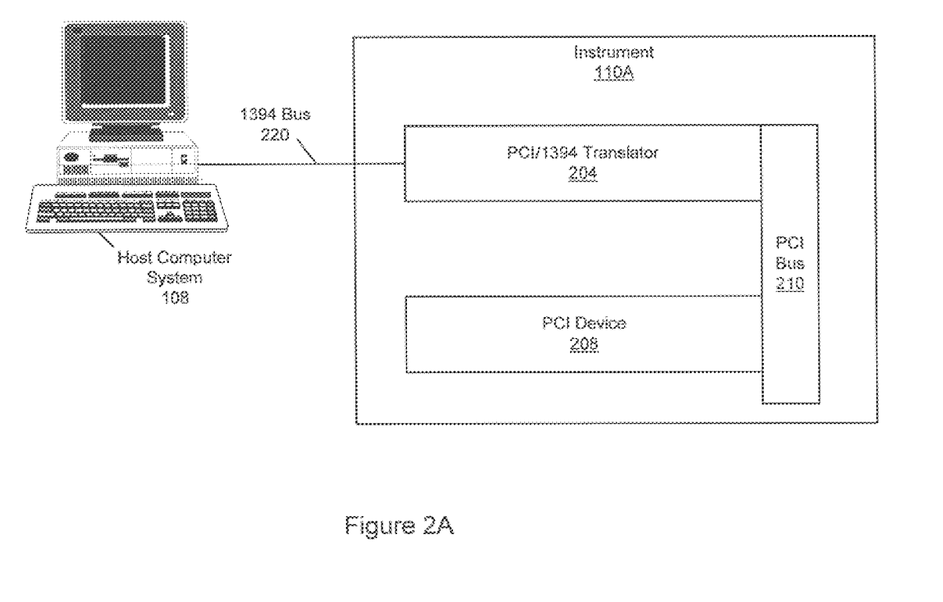
FIG. 2A is an illustration of a 1394/PCI data acquisition system, according to one embodiment.

FIG. 2A: A 1394/PCI Data Acquisition System

FIG. 2A illustrates one embodiment of the data acquisition system 110. As shown in FIG. 2A, host computer system 108 is coupled to a PCI instrument 110A through serial bus 220, such as an IEEE 1394 bus.

In one embodiment, as shown in FIG. 2A, the instrument 110A may include a PCI device 208 which is coupled to a PCI/1394 translator 204 through a PCI bus 210. In one embodiment, the translator 204 may include a National Instruments FirePHLI™, which provides translation between the IEEE 1394 protocol and PCI and error management, described below with reference to FIGS. 5A and 5B. The host computer system 108 may be operable to communicate with the PCI device 208 through the 1394 bus 220 via the 1394/PCI translator 204. The 1394/PCI translator 204 may be operable to translate between the 1394 and PCI address spaces, allowing the host computer system 108 to send 1394 requests to and receive 1394 responses from the PCI device 208. The 1394/PCI translator thus allows existing PCI devices to be used in an IEEE 1394 system. For more information on the 1394/PCI translator 204, please see U.S. Pat. No. 5,875,313 titled "PCI Bus to IEEE 1394 Bus Translator Employing Write Pipe-Lining and Sequential Write Combining", which was incorporated by reference above.

Figure 2B:
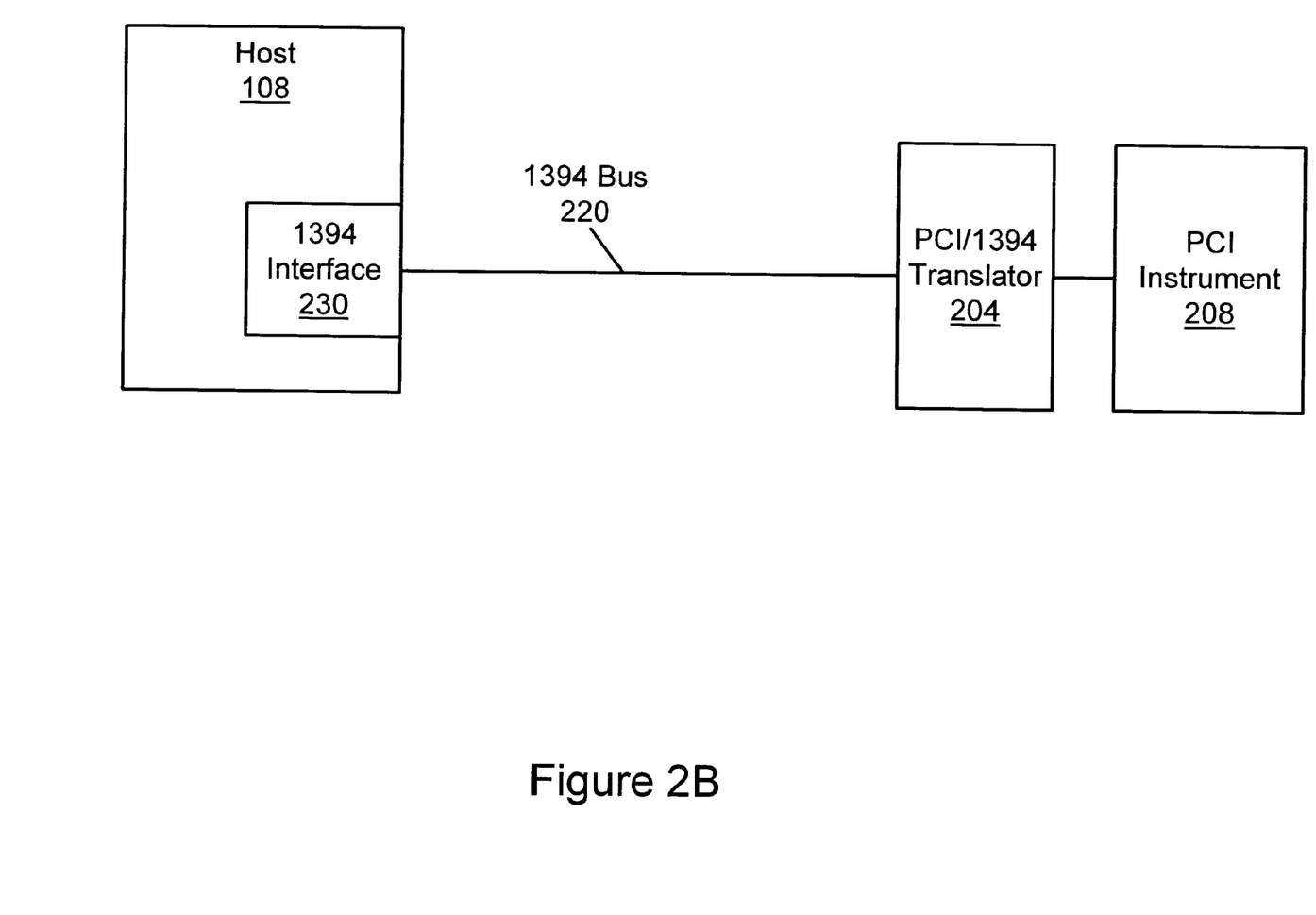
FIG. 2B is a block diagram of a 1394/PCI data acquisition system, according to one embodiment.

FIG. 2B: A 1394/PCI Data Acquisition System

FIG. 2B is a block diagram of the data acquisition system of FIG. 2A, according to one embodiment. As FIG. 2B shows, host 108 is communicatively coupled to PCI instrument 208 through 1394 bus 220 and 1394/PCI translator 204, described above with reference to FIG. 2A. Host 108 is connected to the 1394 bus 220 via a 1394 interface 230.

Figure 3A:
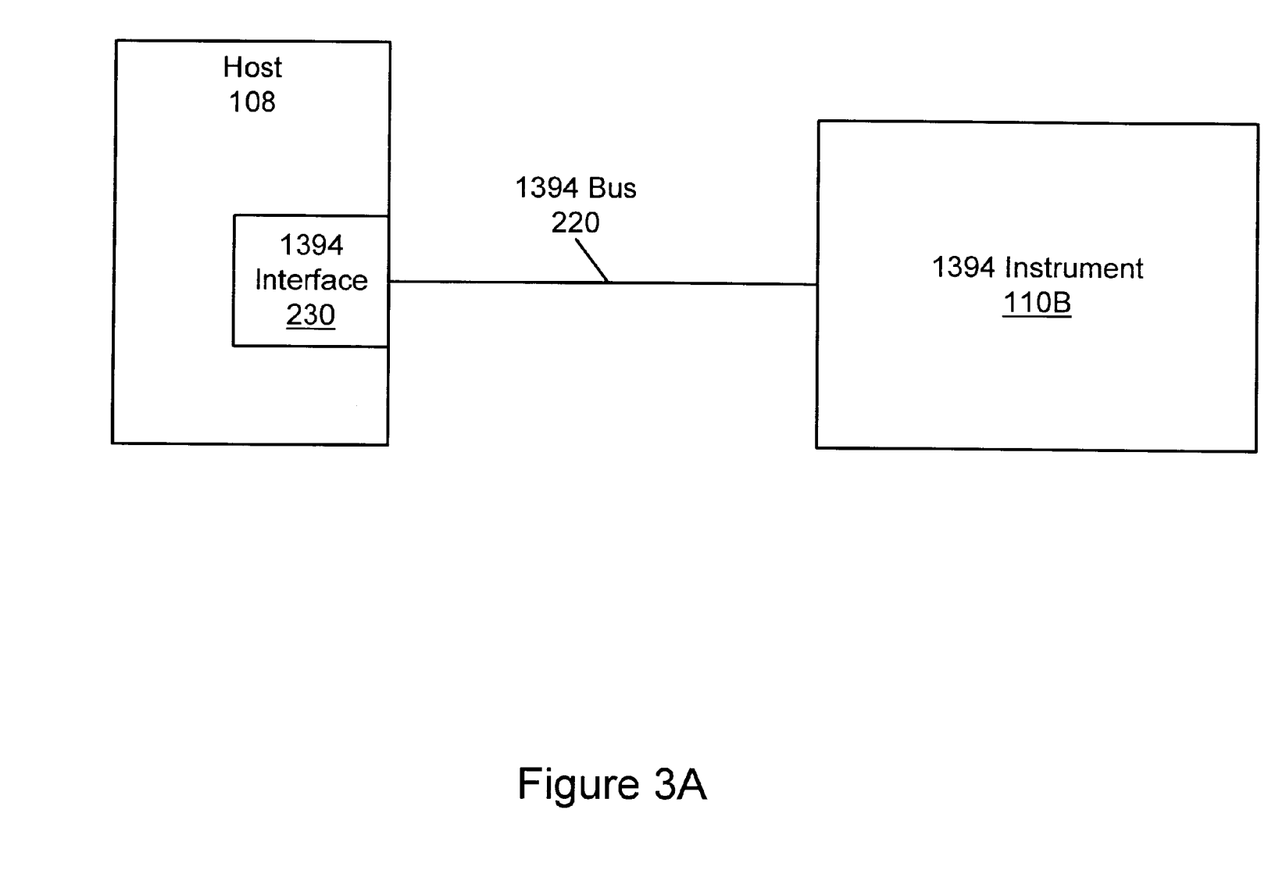
FIG. 3A is a block diagram of a 1394 data acquisition system, according to one embodiment.

FIG. 3A: A 1394 Data Acquisition System

FIG. 3A is a block diagram of a 1394 data acquisition system, according to one embodiment. As shown in FIG. 3A, the host 108 is communicatively coupled to a 1394-compliant instrument 110B through 1394 bus 220. Host 108 is connected to the 1394 bus 220 via 1394 interface 230. In this embodiment, because the instrument 110B is compliant with the IEEE 1394 protocol, translator 204 is not required.

Figure 3B:
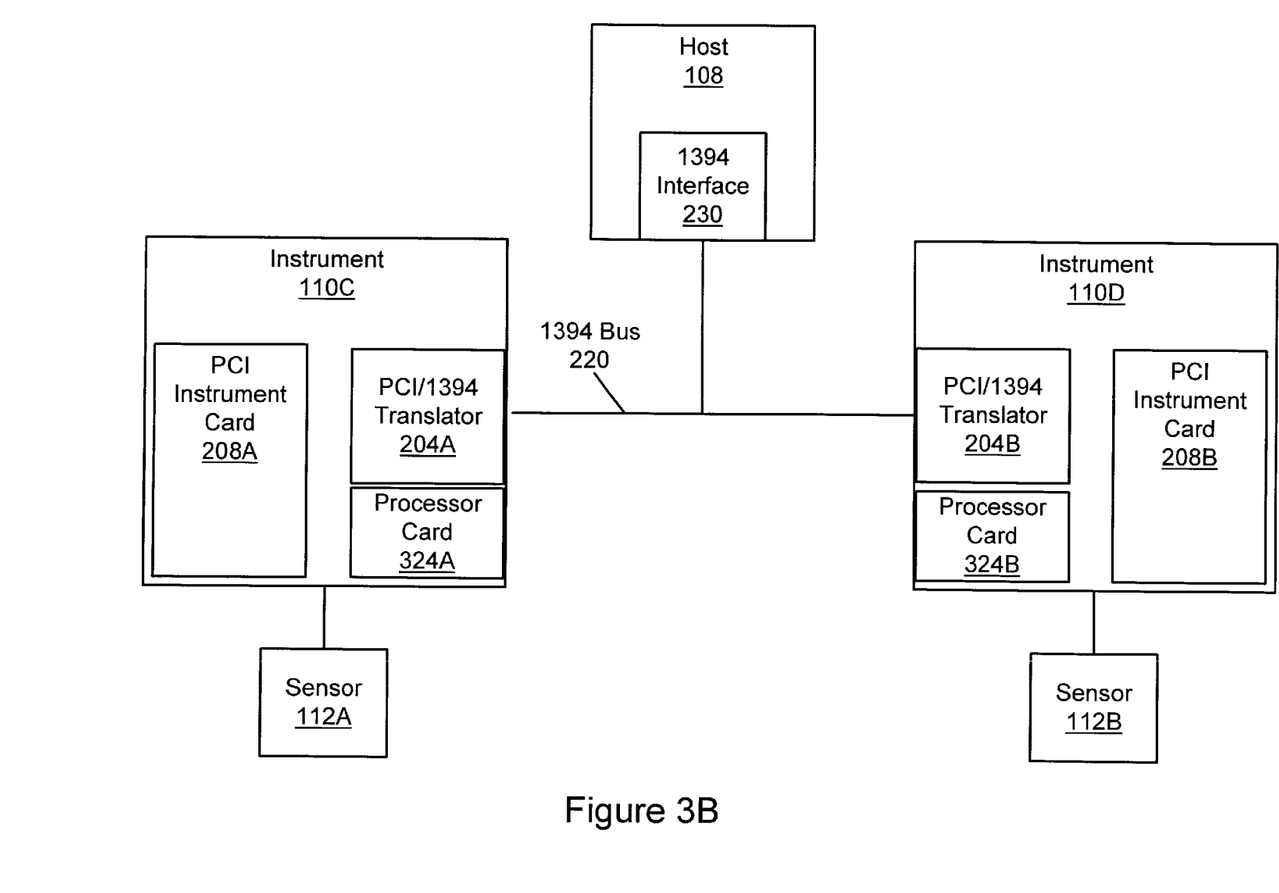
FIG. 3B is a block diagram of a 1394/PCI data acquisition system, according to another embodiment.

FIG. 3B: Another 1394 Data Acquisition System

FIG. 3B is a block diagram of a 1394 data acquisition system, according to another embodiment. In FIG. 3B, a host computer system and two 1394-compliant instruments 110C and 110D are coupled together via the 1394 bus 220. Each instrument 110 is further coupled to a sensor 112 (A and B). In one embodiment, each instrument 110 is configured with a processor card 324 with memory on board to execute driver software, a PCI instrument card 208 which is operable to accept and manage sensor data from sensor 112, and a 1394/PCI bridge or translator 204, such as a National Instruments FirePHLI™, which provides translation between the IEEE 1394 protocol and PCI, and error management, described below with reference to FIGS. 5A and 5B. In some embodiments, the processor card 324 may include any of a variety of processors, such as a CPU, or a Field Programmable Gate Array (FPGA), as well as memory for storing programs and data. The function of the host 108 is to configure the two instruments 110C and 110D for the bus 220 so that the two instruments 110C and 110D may communicate with each other as peers. Once the two instruments 110C and 110D are configured for the bus 220, the host 108 is no longer needed for further operations, although it should be noted that the host 108 should not be disconnected because this would cause a bus reset, which would then require that the two instruments 110C and 110D be configured again.

1394/PCI Translator Functionality

In each of the embodiments where the 1394/PCI Translator (e.g., the FirePHLI™) is used the FirePHLI™ chip provides the following functionality:

a) Translates register Read/Write packets into a PCI Read/Write operations.

b) Segments device's PCI address space into two pieces. The lower 2 GB can be mapped into address space of any other 1394 node on the bus, whereas the upper 2 GB are mapped into a local memory space of the remote device. When referring to memory and the PCI bus, the terms "local" and "device's" will be used interchangeably. Note also that as used herein, the 1394 node that the lower 2 GB address space is mapped into will be referred to as the host because in exemplary embodiments of the invention DAQ devices are used to write into or read from the host computer memory.

c) Translates interrupt cycles on the local PCI bus into 1394 packets. These packets can than cause interrupts on the destination node.

d) Fetches data from the host in response to a local PCI read operation targeted at the host's address space. Since each device initiated (DI) read transaction can take anywhere from a few micro-seconds to a few hundred micro-seconds, sequential host memory accesses are optimized through buffering: each time a host memory read is issued, the FirePHLI reads not only the requested number of bytes (sizeOfRead), but also an additional N minus sizeOfRead bytes from the sequential addresses. Thus the FirePHLI essentially performs a read pre-fetching operation to request additional data each time a read occurs. The value of N can be programmed to any integer value divisible by 4 between four and the maximum packet size for the corresponding transfer speed. For example, if N=512, the sizeOfRead is 4, and read is issued from address 0×1000, the FirePHLI will prefetch bytes on addresses 0×1000 through 0×1000+N=0×11FF into its read buffers and return data located at 0×1000 to 0×1003 to the issuer (the 0×prefix denotes hexadecimal numbers). If the next local read is issued from the sequential address (0×1004 in this example) and is of the same size, the FirePHLI will not re-read data from the host. Instead, it will read data from its buffer thus removing overhead of a 1394 transaction. On the other hand, if the next read is issued from a non-sequential address, for example 0×1100, the read is considered out-of-order and the FirePHLI will prefetch new data from locations 0×1100 to 0×12FF. The same will happen if the new read is of a different size.

Each time a new block of data is read from the host memory, all unused data located in the buffer the new data is being prefetched into is flushed. To minimize the flushing of the unused data from the read buffers, the FirePHLI has multiple dedicated read buffers: the new data will be stored into an empty buffer, or, if no empty buffers are available, into the buffer whose data has been least recently prefetched.

e) Sends data to the host memory when a write operation into the host memory is performed on the local PCI bus. Since each DI write transaction can take anywhere from a few micro-seconds to a few hundred microseconds, creating a packet for each write is expensive and causes large overhead on the bus (for each 1–4 bytes of data transferred, another 16–24 bytes are used for packet headers, CRC codes, etc.). For that reason, the FirePHLI has multiple dedicated write buffers that are used to store in-order write data. Each time a write to the host address space is issued, the FirePHLI compares the current and the previous destination addresses and sizes. If the transfer sizes are equal, and the difference between the current and the previous destination address is equal to the transfer size, the new data is simply appended to the corresponding write buffer. If not, the least recently accessed write buffer whose data has been sent to the host is used to store the new information. If all buffers still contain unsent data and the new data can not be appended to any of them because the local PCI write does not adhere to the given rules or the correct buffer is full, a retry is issued on the local PCI bus. The write buffers are flushed in the first accessed fashion each time the FirePHLI is granted access to the 1394 bus.

If a low speed data acquisition is running on a device, it is possible that the 1394 bus will be granted fast enough so that any data pending in the FirePHLI write buffers will be flushed before a new data is generate by the DAQ HW. In that case, the packets going over the wire will cause large overhead. However, since the bus has been granted, it means that nobody is using it and the overhead is not a problem. On the other hand, if the 1394 bus is very busy, it will be granted to the device only sporadically, and the advantage of the FirePHLI buffering scheme becomes apparent. In effect, the size of the FirePHLI buffers can be added to the size of the device input FIFOs.

In one embodiment according to the present invention, the FirePHLI 204 provides 1394/PCI translation services for the PCI instrument card 208, and shadows memory addresses of the PCI instrument card 208 for error management, described below with reference to FIGS. 5A and 5B. According to one embodiment, in shadowing memory addresses of the PCI instrument card 208, the FirePHLI 204 may store two memory addresses which differ only by a toggle bit, and which point to the same physical memory location. Host computer software may utilize the toggle bit in an address to manage successive transfer requests to that address's memory location, such as to determine whether a prior request to that address returned successfully, or by toggling the toggle bit to indicate that a prior request to that address returned successfully.

Figure 4:
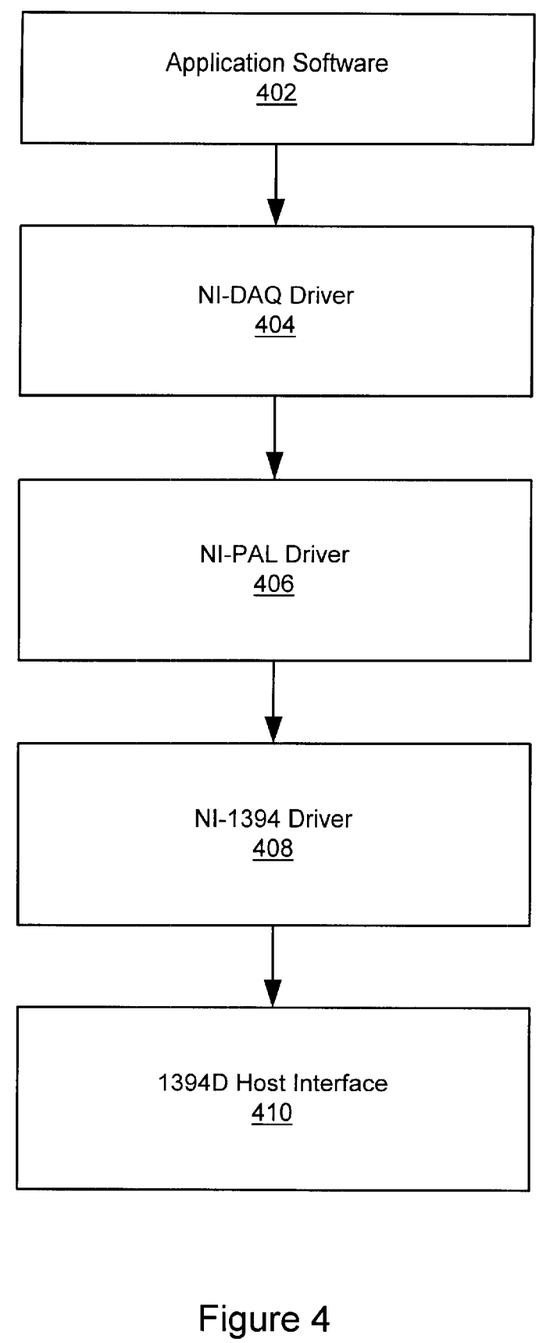
FIG. 4 is a block diagram of the software architecture of the system, according to one embodiment.

FIG. 4: Software Architecture

FIG. 4 is a block diagram of the software architecture of the system, according to one embodiment. As FIG. 4 shows, the top layer of the software architecture is application software 402. The application software 402 may be any software program which is operable to provide an interface for control and/or display of a data acquisition (DAQ) process. In one embodiment, the software application 402 may include a program developed in National Instrument's LabVIEW™ or LabWindows/CVI development environments. A driver program 404 may be below the application software 402. The driver 404 may be a DAQ driver 404, such as National Instrument's NI-DAQ driver program. The next software layer may optionally be a platform abstraction layer (PAL) driver 406, such as National Instrument's NI-PAL driver program. The PAL 406 may operate to abstract the internal communication bus and operating system to a common API. A 1394 platform abstraction layer firewire (PAL-FW) 1394 driver 408, such as National Instrument's NI-PAL F/W driver program may be below the NI-PAL driver 406. This software preferably manages the data transmission error handling process according to one embodiment of the present invention, described below with reference to FIGS. 5A and 5B. A 1394D host interface 410 is below the NI-PAL F/W driver 408, such as provided by Microsoft Corporation, which abstracts the driver layer. The 1394D host interface 410 provides an interface to 1394 chipset driver software, such as OHCI 1394 driver software, which interfaces with the relevant hardware; i.e., the 1394 interface hardware.

Figure 5A:
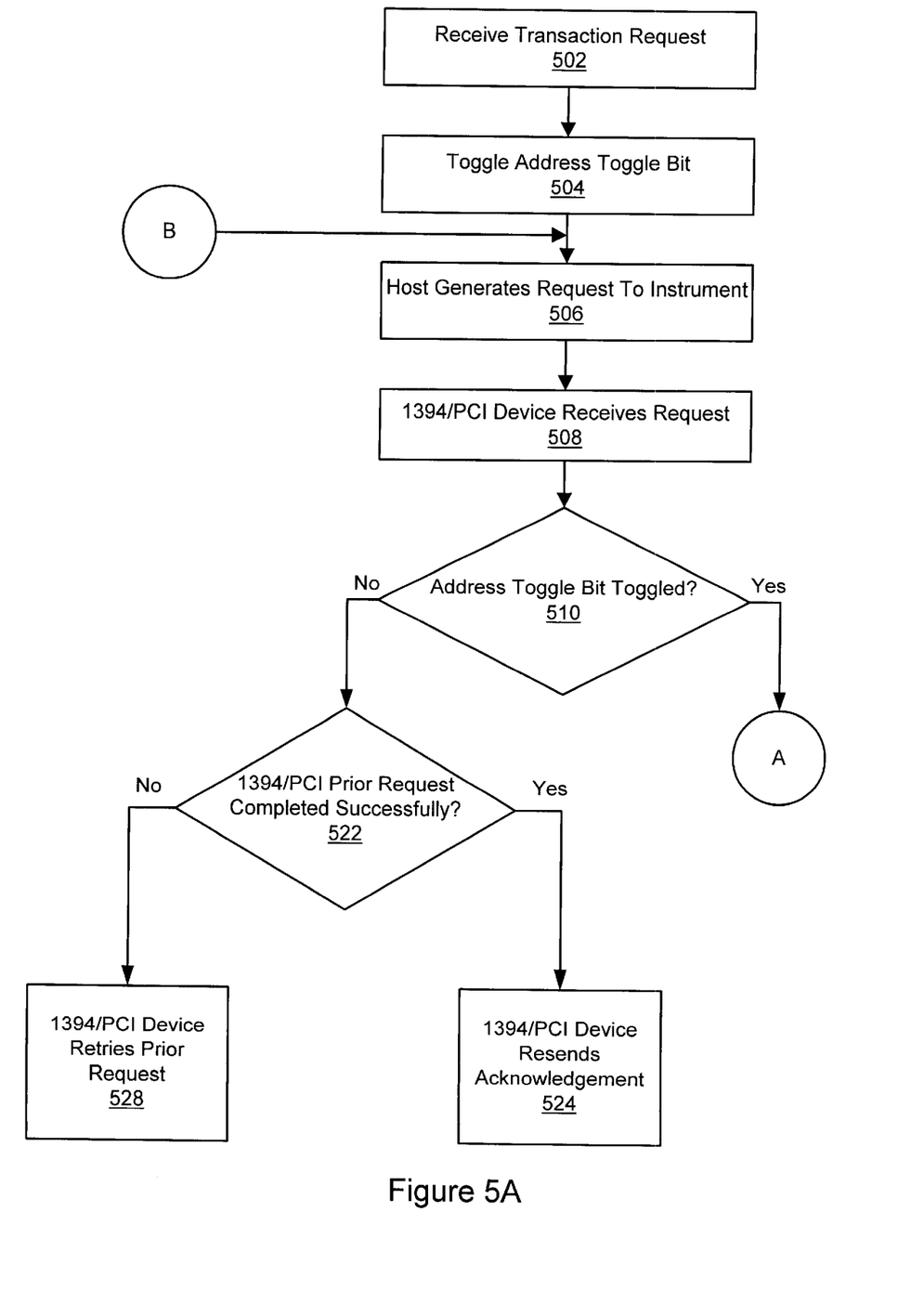
FIGS. 5A & 5B are flowcharts of a request process, according to one embodiment.
Figure 5B:
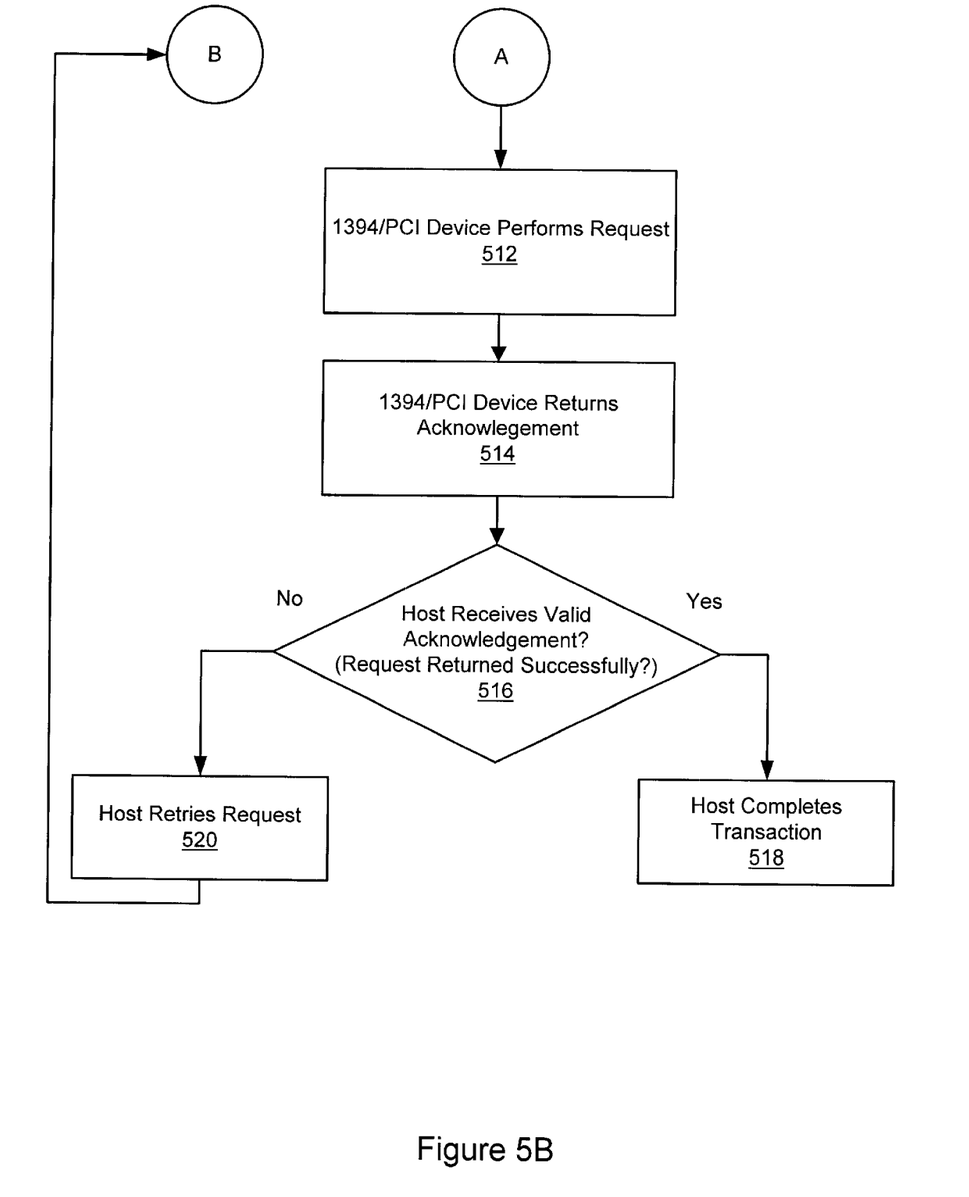

FIGS. 5A & 5B: The Request Process

FIGS. 5A & 5B are a flowchart of a request process, according to one embodiment. The request process may be related to management of a data acquisition (DAQ) system composed of a host system 108 coupled to a DAQ device 110 through a communication medium 220 with error detection capabilities, such as a bus or network. In one embodiment, the communication medium 220 may not include error handling capabilities. In a preferred embodiment, the communication medium 220 may be an IEEE 1394 bus, which is compliant with an IEEE 1394 protocol specification. The device 110 may include a 1394/PCI translator device, as described above with reference to FIGS. 2 and 3 above. The host system may comprise a computer system, with a CPU and memory for storing data and software. The request process shown in FIGS. 5A and 5B is operable to properly handle device retry requests on the communication medium 220.

As FIG. 5A shows, in 506 the host computer system generates a request to access the DAQ device. The request may include a first device request to read from or write to a memory address location of the device. As used herein, the term "access" may be used to refer to either a read operation or a write operation on a memory address location. In one embodiment, the first device request may include an address of the memory location and status information which indicates whether a prior device request to the memory address location of the device returned successfully. Thus the status information may indicate whether the current or first device request is a retry of a prior request or a new request.

In 508 the device receives the first device request, preferably from the host system over the 1394 bus. Then, in 510 the device examines the status information to determine if the first device request to the memory address location of the device is a retry of a prior device request to the memory address location of the device. In a preferred embodiment, the status information may comprise a toggle bit which is contained in the memory address of the first device request. If the toggle bit has not been toggled, e.g., changed from a 0 to a 1 or from a 1 to a 0, then the first device request is a retry of a prior device request; if the toggle bit has been toggled, then the first device request is a new request. In one embodiment, the status information may be examined by the FirePHLI, described above.

Once the status information has been examined, then if the status information indicates that the device request is a retry of a prior device request, in 522 the device determines if the prior device request completed successfully to the memory address location of the device. If the prior device request did complete successfully to the memory address location of the device, the device knows that an acknowledgment for the prior request failed, and will not perform the request, but may resend the acknowledgement, as indicated in 524. If, on the other hand, the prior device request did not complete successfully to the memory address location of the device, the device may retry the prior request, as indicated in 528.

If the first device request is not a retry of the prior device request to the memory address location of the device, then, as shown in FIG. 5B, in 512 the device performs the first device request, and in 514 returns an acknowledgement to the host, indicating that the first device request was completed successfully. The device may also store information on the first device request for possible later use in comparison with a subsequent device request.

In 516, the host determines whether a valid acknowledgement was received indicating that the first device request was completed and returned successfully. If the host computer system does not receive valid acknowledgement from the device, then, in 520, the host computer system retries the first device request and generates the retry request to the instrument in step 506, as shown in FIG. 5A. In one embodiment, the host computer system may retry the request a predetermined number of times before signaling failure, such as by generating an exception.

If the host receives a valid acknowledgement in 516, then in 518 the host computer system completes a transaction associated with the first device request in response to the host computer system receiving a valid acknowledgement from the device. Once the host computer system receives the valid acknowledgement from the device in 516 and completes the transaction associated with the first device request, a new transaction request may be received, as indicated in 502, which results in a new device request being generated by the host computer system. The new device request may comprise a request to read from or write to the memory address location of the device. In 504, the host computer system may manipulate the status information in the new device request to indicate that the first device request to the memory address location of the device returned successfully. Thus the status information indicates that the new device request is not a retry. In one embodiment, as mentioned above, the status information may be comprised in the address of the device request, and may comprise a status bit, which may be toggled by the host computer system to indicate that the prior device request to the memory address location of the device returned successfully.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method for transferring data in a system including a communication medium, wherein the communication medium includes error detection capabilities, the method comprising:

generating a first device. request to a device, wherein the first device request comprises a request to read from or write to a memory address location of the device, and wherein the first device request includes an address, wherein the first device request includes status information which indicates whether a prior device request to the memory address location of the device returned successfully;

the device receiving the first device request;

the device examining the status information to determine if the first device request to the memory address location of the device is a retry of a prior device request to the memory address location of the device;

the device determining if the prior device request completed successfully to the memory address location of the device if the device determines that the first device request is a retry of the prior device request to the memory address location of the device; and the device performing the first device request if the first device request is a retry of the prior device request to the memory address location of the device and the prior device request did not complete successfully to the memory address location of the device; and the device sending an acknowledgement for the first device request if the first device request is a retry of the prior device request to the memory address location of the device and the prior device request did complete successfully to the memory address location of the device.

2. The method of claim 1, further comprising:

the device performing the first device request if the first device request is not a retry of the prior device request to the memory address location of the device.

3. The method of claim 2, wherein the system includes a computer system coupled through the communication medium to the device, the method further comprising:

the device returning an acknowledgement to the computer system after the device performing the first device request;

the computer system completing a transaction associated with the first device request in response to the computer system receiving a valid acknowledgement from the device;

the computer system retrying the first device request in response to the computer system not receiving a valid acknowledgement from the device.

4. The method of claim 3, further comprising:

the computer system generating a new device request to the device after the computer system receiving the valid acknowledgement from the device and the computer system completing the transaction associated with the first device request, wherein the new device request comprises a request to read from or write to the memory address location of the device, wherein the computer system manipulates the status information in the new device request to indicate that the first device request to the memory address location of the device returned successfully.

5. The method of claim 4, wherein the status information is comprised in the address of the first device request.

6. The method of claim 5, wherein the status information comprises a status bit;

wherein the computer system toggles the status bit to indicate that the prior device request to the memory address location of the device returned successfully.

7. The method of claim 1, wherein the communication medium does not include error handling capabilities.

8. The method of claim 1, wherein the communication medium comprises an IEEE 1394 bus, wherein the IEEE 1394 bus is compliant with an IEEE 1394 protocol specification.

9. The method of claim 1, wherein the device comprises an instrument, and wherein the device is operable to acquire data from a sensor.

10. The method of claim 1, wherein the system includes a computer system coupled through the communication medium to the device;

wherein the device comprises an instrument, and wherein the device is operable to acquire data from a sensor.

11. A method for transferring data in a system including a communication medium, wherein the communication medium includes error detection capabilities, the method comprising:

the device receiving a first device request, wherein the first device request comprises a request to read from or write to a memory address location of the device, and wherein the first device request includes an address, wherein the first device request includes status information which indicates whether a prior device request to the memory address location of the device returned successfully;

the device examining the status information to determine if the first device request to the memory address location of the device is a retry of a prior device request to the memory address location of the device;

the device determining if the prior device request completed successfully to the memory address location of the device if the device determines that the first device request is a retry of the prior device request to the memory address location of the device; and the device performing the first device request if the first device request is a retry of the prior device request to the memory address location of the device and the prior device request did not complete successfully to the memory address location of the device; and the device sending an acknowledgement for the first device request if the first device request is a retry of the prior device request to the memory address location of the device and the prior device request did complete successfully to the memory address location of the device.

12. The method of claim 11, further comprising:

the device performing the first device request if the first device request is not a retry of the prior device request to the memory address location of the device.

13. A system for transferring data, the system comprising:

a device, wherein the device comprises a plurality of memory address locations;

a communication medium, wherein the device is coupled to the communication medium, wherein the communication medium includes error detection capabilities;

a computer system, wherein the computer system is coupled to the communication medium and is operable to communicate through the communication medium to the device;

wherein the computer system is operable to generate a first device request to the device, wherein the first device request comprises a request to read from or write to a memory address location of the device, and wherein the first device request includes an address, wherein the first device request includes status information which indicates whether a prior device request to the memory address location of the device returned successfully;

wherein the device is operable to:
receive the first device request;
examine the status information to determine if the first device request to the memory address location of the device is a retry of a prior device request to the memory address location of the device;
determine if the prior device request completed successfully to the memory address location of the device if the device determines that the first device request is a retry of the prior device request to the memory address location of the device;
perform the first device request if the first device request is a retry of the prior device request to the memory address location of the device and the prior device request did not complete successfully to the memory address location of the device;
send an acknowledgement for the first device request if the first device request is a retry of the prior device request to the memory address location of the device and the prior device request did complete successfully to the memory address location of the device.

14. The system of claim 13, wherein the device performs the first device request if the first device request is not a retry of the prior device request to the memory address location of the device.

15. The system of claim 14, further comprising a computer system coupled through the communication medium to the device, wherein the device returns an acknowledgement to the computer system after the device performs the first device request;

wherein the computer system completes a transaction associated with the first device request in response to the computer system receiving a valid acknowledgement from the device; and wherein the computer system retries the first device request in response to the computer system not receiving a valid acknowledgement from the device.

16. The system of claim 15, wherein the computer system generates a new device request to the device after the computer system receives the valid acknowledgement from the device and the computer system completes the transaction associated with the first device request, wherein the new device request comprises a request to read from or write to the memory address location of the device, wherein the computer system manipulates the status information in the new device request to indicate that the first device request to the memory address location of the device returned successfully.

17. The system of claim 16, wherein the status information is comprised in the address of the first device request.

18. The system of claim 17, wherein the status information comprises a status bit;

wherein the computer system toggles the status bit to indicate that the prior device request to the memory address location of the device returned successfully.

19. The system of claim 13, wherein the status information is comprised in the address of the first device request.

20. The system of claim 19, wherein the status information comprises a status bit;

wherein the computer system toggles the status bit to indicate that the prior device request to the memory address location of the device returned successfully.

21. The system of claim 13, wherein the communication medium does not include error handling capabilities.

22. The system of claim 13, wherein the communication medium comprises an IEEE 1394 bus, wherein the IEEE 1394 bus is compliant with an IEEE 1394 protocol specification.

23. The system of claim 13, wherein the device comprises an instrument, and wherein the device is operable to acquire data from a sensor.

24. The system of claim 13, wherein the system includes a computer system coupled through the communication medium to the device;

wherein the device comprises an instrument, and wherein the device is operable to acquire data from a sensor.

* * * * *

UNITED STATES PATENT AND TRADEMARK OFFICE
CERTIFICATE OF CORRECTION

PATENT NO. : 6,640,312 B1
DATED : October 28, 2003
INVENTOR(S) : Thomson et al.

It is certified that error appears in the above-identified patent and that said Letters Patent is hereby corrected as shown below:

Column 10,
Line 38, please delete the period "." between the words "device" and "request".

Signed and Sealed this

Sixteenth Day of December, 2003

JAMES E. ROGAN
*Director of the United States Patent and Trademark Office*